United States Patent [19]
Drake et al.

[11] Patent Number: 5,905,880
[45] Date of Patent: May 18, 1999

[54] ROBUST MULTIPLE WORD INSTRUCTION AND METHOD THEREFOR

[75] Inventors: Rodney J. Drake; Joseph W. Triece, both of Phoenix, Ariz.

[73] Assignee: Microchip Technology Incorporated

[21] Appl. No.: 08/937,682

[22] Filed: Sep. 29, 1997

[51] Int. Cl.[6] .................................................. G06F 9/32
[52] U.S. Cl. .......................................................... 395/386
[58] Field of Search ..................................... 395/386, 380

[56] References Cited

U.S. PATENT DOCUMENTS

| | | | |
|---|---|---|---|
| 4,566,063 | 1/1986 | Zolnowsky et al. | 395/182.14 |
| 4,709,324 | 11/1987 | Kloker | 395/383 |
| 4,872,109 | 10/1989 | Horst et al. | 395/569 |
| 5,388,233 | 2/1995 | Hays et al. | 395/375 |
| 5,732,234 | 3/1998 | Vassilladis et al. | 395/376 |
| 5,758,116 | 5/1998 | Lee et al. | 395/386 |

*Primary Examiner*—David Y. Eng
*Attorney, Agent, or Firm*—Harry M. Weiss; Jeffrey D. Moy; Harry M. Weiss & Associates, P.C.

[57] ABSTRACT

An instruction set for a microcontroller which has robust multiple word instructions. The instruction set has a plurality of instructions wherein the plurality of instructions comprises single word instructions and multiple word instructions. At least one bit is located in a predetermined location in all non-first words of all multiple word instructions. The bit will be decoded by the microcontroller as no operation bit if the first word of the multiple word instruction is not executed prior to execution of any succeeding words in the multiple word instruction.

18 Claims, 1 Drawing Sheet

ROBUST MULTIPLE WORD INSTRUCTION AND METHOD THEREFOR

BACKGROUND OF THE INVENTION

1. Field of the Invention

This invention relates generally to microcontrollers, and more specifically, to an instruction set for a microcontroller which has robust multiple word instructions and a method therefor.

2. Background of the Invention

Presently, in some microcontrollers, all instructions are single word instructions. This means that a single word is used to inform the microcontroller of each specific operation to be performed. A problem with single word instructions is that they limit the amount of addressable memory space since single word instructions only have a limited number of address bits.

In order to increase the addressable memory space, multiple word instructions may be used. However, multiple word instructions create several different problems. First, some instructions that are used are SKIP instructions. For single word instructions this does not create a problem since the next word will generally be an executable instruction. Thus, the SKIP instruction will be set to skip one location. However, if multiple word instructions are used, the microcontroller needs to know how many words need to be skipped over in order to get to the next instruction to be executed. There may be severe speed limitations that result from requiring an advanced knowledge of the number of words in an instruction. This creates serious problems for those designing the microcontroller.

Another problem with using multiple word instructions is that the microcontroller may inadvertently jump to an unwanted location (i.e., in the middle of a multiple word instruction). Obviously, one would not want the microcontroller to execute an unwarranted portion of a multiple word instruction.

Therefore, a need existed to provide an improved instruction set for a microcontroller. The improved instruction set must increase the addressable memory space to be used by the microcontroller by allowing multiple word instructions to be used. The improved instruction set which uses multiple word instructions must signal the microcontroller where the next instruction to be executed is located in order to determine how many words need to be skipped over. The improved instruction set which uses multiple word instructions must also signal the microcontroller how many words need to be skipped over if the microcontroller inadvertently jumps to an unwanted location in the middle of a multiple word instruction.

SUMMARY OF THE INVENTION

In accordance with one embodiment of the present invention, it is an object of the present invention to provide an improved instruction set for a microcontroller.

It is another object of the present invention to provide an improved instruction set for a microcontroller that increases the addressable memory space to be used by the microcontroller by allowing multiple word instructions to be used.

It is still another object of the present invention to provide an improved instruction set for a microcontroller which uses multiple word instructions that signals the microcontroller where the next instruction to be executed is located in order to determine how many words in a multiple word instruction need to be skipped over.

It is still another object of the present invention to provide an improved instruction set for a microcontroller which uses multiple word instructions and which signals the microcontroller how many words need to be skipped over if the microcontroller inadvertently jumps to an unwanted location in the middle of a multiple word instruction.

BRIEF DESCRIPTION OF THE PREFERRED EMBODIMENTS

In accordance with one embodiment of the present invention, an instruction set for a microcontroller which has robust multiple word instructions is disclosed. The instruction set has a plurality of instructions wherein the plurality of instructions comprises single word instructions and multiple word instructions. At least one bit is located in a predetermined location in all non-first words of a multiple word instruction. The at least one bit will be decoded by the microcontroller as no operation bit(s) if the first word of the multiple word instruction is not executed prior to any succeeding words in the multiple word instruction.

In accordance with another embodiment of the present invention, a method of providing an instruction set for a microcontroller which has robust multiple word instructions is disclosed. The method comprises the steps of: providing a plurality of instructions wherein the plurality of instructions are single word instructions and multiple word instructions; and establishing at least one bit in a predetermined location in all non-first words of a multiple word instruction wherein the at least one bit will be decoded by the microcontroller as no operation bit(s) if the first word of the multiple word instruction is not executed prior to any succeeding words in the multiple word instruction.

The foregoing and other objects, features, and advantages of the invention will be apparent from the following, more particular, description of the preferred embodiments of the invention, as illustrated in the accompanying drawing.

DETAILED DESCRIPTION OF THE PREFERRED EMBODIMENTS

Figure 1:
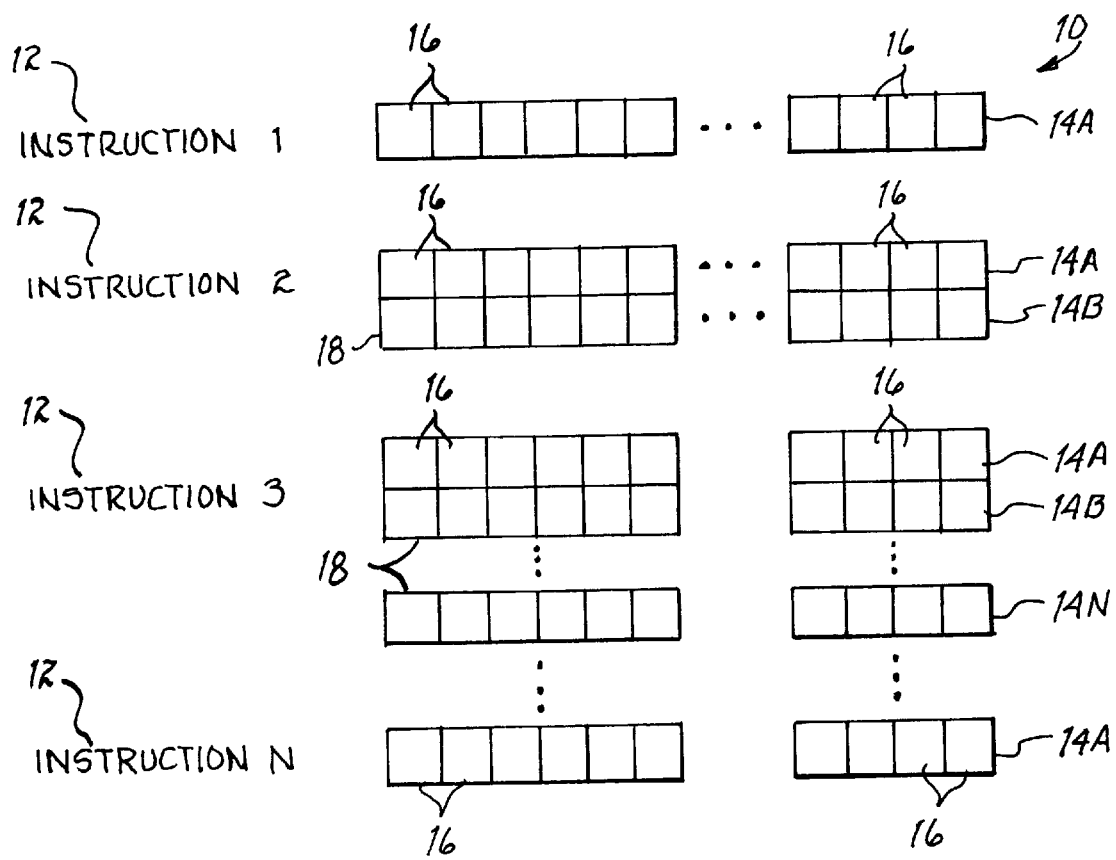
FIG. 1 depicts a simplified embodiment of the instruction set of the present invention which has robust multiple word instructions.

Referring to FIG. 1, an instruction set 10 for a microcontroller is shown. The instruction set 10 is comprised of a plurality of instructions 12. Each instruction 12 made up of one or more words 14A–14N. Thus, each instruction 12 is either a single word instruction like INSTRUCTION 1 and INSTRUCTION N or a multiple word instruction like INSTRUCTION 2 and INSTRUCTION 3.

Each word 14A–14N of each instruction 12 is comprised of a plurality of bits 16. In the preferred embodiment of the present invention, each word 14A–14N of each instruction 12 is a 16-bit word. However, the number of bits 16 in each word 14A–14N may be larger or smaller depending on the application and the microcontroller to be used.

In multiple word instructions, the succeeding words are intended to be used as operands and not opcodes. If fetched and executed as an opcode, the operation performed and executed needs to be a "no operation" so as not to corrupt program execution. Thus, in each multiple word instruction (i.e., INSTRUCTION 2 and INSTRUCTION 3), at least one no operation bit 18 will be established in a predetermined location in each non-first word 14B–14N (i.e., all words of a multiple word instruction after the first word). The no operation bit 18 will cause each non-first word 14B–14N of a multiple word instruction to be recognized as a no operation word if the first word 14A is not executed prior to execution of succeeding words in the multiple word instruction. Thus, in INSTRUCTION 3, if the microcontroller inadvertently jumps to the second word 14B or the Nth word 14N in the instruction, the microcontroller will decode each word 14B–14N as no operation words if the first word 14A is not executed prior to execution of the second word 14B or the Nth word 14N.

By establishing a no operation bit 18 in each non-first word 14B–14N of a multiple word instruction, SKIP instructions will not have to determine how many words need to be skipped in order to execute the next succeeding instruction or operand. The skip instruction will only need to skip the first word 14A of the multiple word instruction since all other words 14B–14N will be decoded as no operation words if the first word 14A is not executed prior to execution of succeeding words 14B–14N. The no operation bit 18 will also prevent execution of unwanted instructions and operands of a multiple word instruction if the program causes a jump into the middle of a multiple word instruction without first executing the first word of the multiple word instruction.

In the preferred embodiment of the present invention, each word 14A–14N of each instruction 12 is a 16-bit word and four bits are used as no operation bits 18. Preferably, the no operation bits 18 are set in the upper four bits of each non-first word 14B–14N in the multiple word instruction. Each instruction 12 can also be encoded in a hexadecimal format. Thus, in the preferred embodiment of the present invention, each non-first word 14B–14N in a multiple word instruction will be encoded as FXXX h. The microcontroller will interpret the "F" as no operation if the first word 14A is not executed prior to execution of any succeeding words 14B–14N in the multiple word instruction.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An instruction set for a microcontroller which has robust multiple word instructions comprising, in combination:

a plurality of instructions wherein said plurality of instructions are single word instructions and multiple word instructions; and at least one bit in a predetermined location in all words of a multiple word instruction after a first word of said multiple word instruction wherein said at least one bit will be decoded by said microcontroller as no operation bit if said first word of said multiple word instruction is not executed first.

2. An instruction set for a microcontroller which has robust multiple word instructions in accordance with claim 1 wherein said at least one bit is located in an upper portion in all words of a multiple word instruction after a first word of said multiple word instruction.

3. An instruction set for a microcontroller which has robust multiple word instructions in accordance with claim 1 wherein each word of said single word instructions and said multiple word instructions are 16 bit words.

4. An instruction set for a microcontroller which has robust multiple word instructions in accordance with claim 1 wherein four bits are used in predetermined locations in all words of a multiple word instruction after a first word of said multiple word instruction wherein said four bits will be decoded by said microcontroller as no operation bits if said first word of said multiple word instruction is not executed first.

5. An instruction set for a microcontroller which has robust multiple word instructions in accordance with claim 4 wherein said four bits are set in an upper four bits in all words of a multiple word instruction after a first word of said multiple word instruction.

6. An instruction set for a microcontroller which has robust multiple word instructions in accordance with claim 1 wherein each word of said single word instructions and said multiple word instructions are encoded as hexadecimal numbers.

7. A robust multiple word instruction comprising, in combination:

an instruction having a plurality of words; and at least one bit in a predetermined location in all words of said instruction after a first word of said plurality of words wherein said at least one bit will cause said microcontroller to decode each word after said first word of said plurality of words as no operation if said first word of said plurality of words is not executed first.

8. A robust multiple word instruction in accordance with claim 5 wherein said at least one bit is located in an upper portion in all words after said first word of said plurality of words.

9. A robust multiple word instruction in accordance with claim 5 wherein each word of said plurality of words are 16 bit words.

10. A robust multiple word instruction in accordance with claim 7 wherein four bits are used in predetermined locations in all words of said instruction after said first word wherein said four bits will be decoded by said microcontroller as no operation bits if said first word of said instruction is not executed first.

11. A robust multiple word instruction in accordance with claim 10 wherein said four bits are set in an upper four bits in all words of said instruction after said first word.

12. A robust multiple word instruction in accordance with claim 7 wherein each word of said plurality of words are encoded as hexadecimal numbers.

13. A method of providing an instruction set for a microcontroller which has robust multiple word instructions comprising, in combination:

providing a plurality of instructions wherein said plurality of instructions are single word instructions and multiple word instructions; and establishing at least one bit in a predetermined location in all words of a multiple word instruction after a first word of said multiple word instruction wherein said at least one bit will be decoded by said microcontroller as no operation bit if said first word of said multiple word instruction is not executed first.

14. The method of claim 13 wherein said step of establishing at least one bit in a predetermined location further comprises the step of establishing said at least one bit in an upper portion in all words of said multiple word instructions after a first word of said multiple word instruction.

15. The method of claim 13 wherein each word of said single word instructions and said multiple word instructions are 16 bit words.

16. The method of claim 14 wherein four bits are used in predetermined locations in all words of a multiple word instruction after a first word of said multiple word instruction wherein said four bits will be decoded by said microcontroller as no operation bits if said first word of said multiple word instruction is not executed first.

17. The method of claim 16 wherein said four bits are set in an upper four bits in all words of a multiple word instruction after a first word of said multiple word instruction.

18. The method of claim 13 wherein each word of said single word instructions and said multiple word instructions are encoded as hexadecimal numbers.

* * * * *